United States Patent [19]

Haller

[11] Patent Number: 4,707,912
[45] Date of Patent: Nov. 24, 1987

[54] CRASH PROTECTION APPARATUS FOR A DEVICE FOR PULLING A TUBE OUT OF A TUBE SHEET OF A HEAT EXCHANGER

[75] Inventor: Hans Haller, Mannheim, Fed. Rep. of Germany

[73] Assignee: Brown Boveri Reaktor GmbH, Mannheim, Fed. Rep. of Germany

[21] Appl. No.: 873,370

[22] Filed: Jun. 12, 1986

[30] Foreign Application Priority Data

Jun. 14, 1985 [DE] Fed. Rep. of Germany ....... 3521355

[51] Int. Cl.⁴ ............................................. B23P 15/26
[52] U.S. Cl. .................................... 29/726; 29/33 T; 29/235; 29/252; 29/282; 29/426.1; 29/426.5; 29/DIG. 42; 165/76; 376/463
[58] Field of Search ..................... 29/402.3, 33 T, 235, 29/252, 244, 282, 426.1, 723, 726, 426.5, DIG. 42; 165/76; 376/463; 414/745, 746

[56] References Cited

U.S. PATENT DOCUMENTS

| | | | |
|---|---|---|---|
| 1,964,023 | 6/1934 | Armstrong | 29/252 |
| 3,785,026 | 1/1974 | Ohmstede | 29/157.4 |
| 3,836,015 | 9/1974 | Travis | 29/726 X |
| 3,958,698 | 5/1976 | van der Woerd | 29/726 X |
| 3,979,816 | 9/1976 | Green | 29/157.4 |
| 4,168,782 | 9/1979 | Sturges, Jr. | 414/4 |
| 4,205,939 | 6/1980 | Reyes | 165/76 X |
| 4,227,854 | 10/1980 | Coffey | 29/726 X |

FOREIGN PATENT DOCUMENTS 2912797 10/1980 Fed. Rep. of Germany .

Primary Examiner—Howard N. Goldberg
Assistant Examiner—Ronald S. Wallace
Attorney, Agent, or Firm—Herbert L. Lerner; Laurence A. Greenberg

[57] ABSTRACT

A crash protection apparatus for a pulling device having a hollow piston cylinder and a pulling claw for pulling a tube out of a tube sheet of a heat exchanger chamber in which the pulling device is disposed, the crash protection apparatus includes another cylinder without a piston rod having an axis substantially parallel to the axis of the hollow-piston cylinder and being fixed relative to the tube sheet in the chamber, a piston of the other cylinder, a bracket extending from the piston substantially at a right angle to the axis of the other cylinder for supporting the pulling device with a supporting force provided by the other cylinder, and a device for controlling the supporting force for compensating only the weight of the pulling device in each position of the pulling device.

5 Claims, 5 Drawing Figures

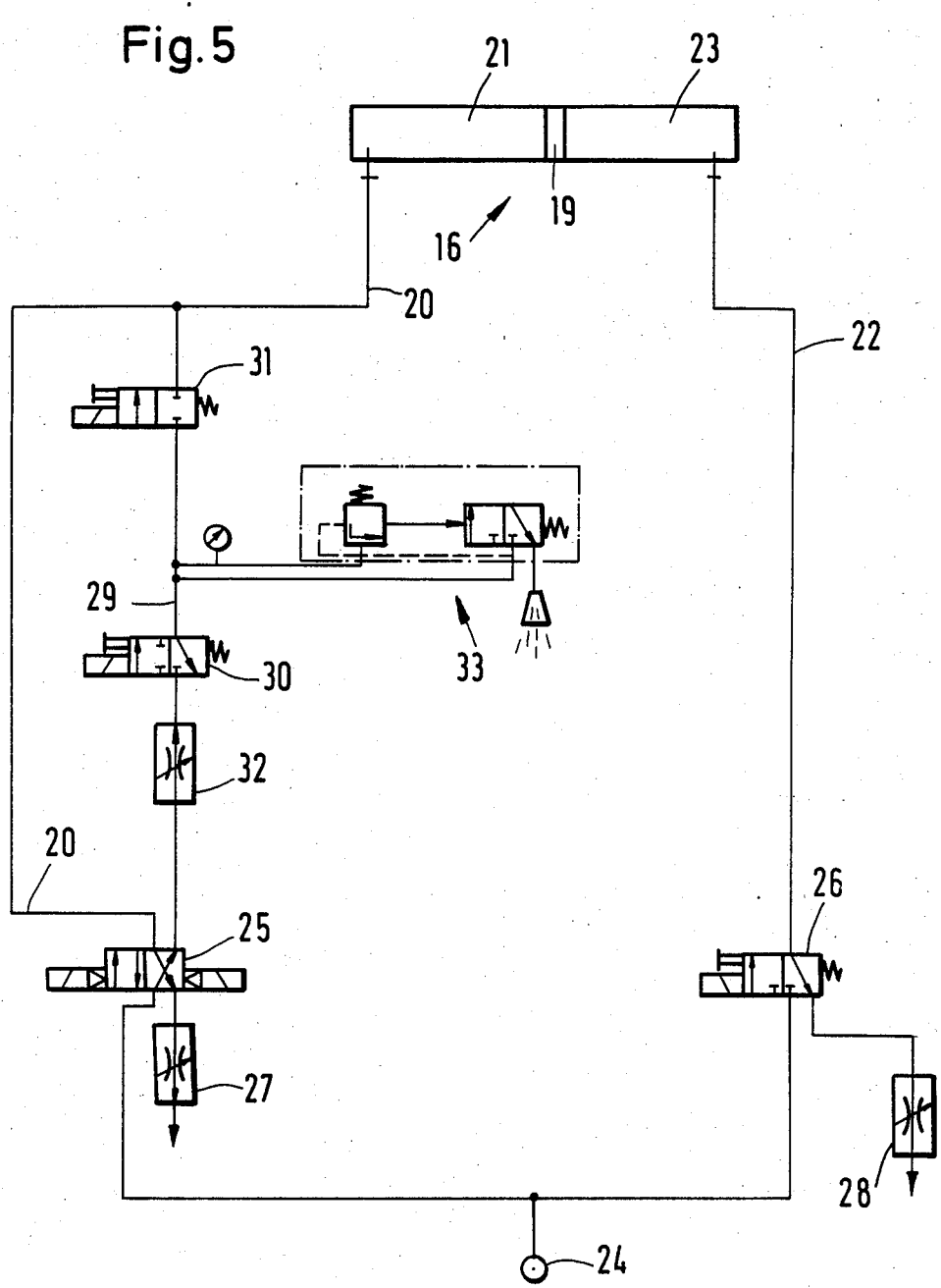

CRASH PROTECTION APPARATUS FOR A DEVICE FOR PULLING A TUBE OUT OF A TUBE SHEET OF A HEAT EXCHANGER

The invention relates to a crash protection apparatus for a device for pulling a tube out of a tube sheet of a heat exchanger chamber in which the pulling device is disposed.

No crash protection has been provided heretofore for such a device because a component of the pulling device which is under continuous pretension is supposed to prevent crashing. However, if the tube to be pulled is separated into partial sections of about 500 mm by means of an internal cutter before the start of the pulling operation, the instant at which the adhesion between the tube sheet and the tube portion to be pulled no longer holds the intrinsic weight of the tube pulling device, is difficult to estimate at the end of the pulling operation. Crash protection should therefore be provided at least for the last section of the pulling process. Such a crash for the pulling must be considered for safety considerations.

It is accordingly an object of the invention to provide a crash protection apparatus for a device for pulling a tube out of a tube sheet of a heat exchanger which is connected to the pulling device during periods of standstill as during up and down motions thereof.

With the foregoing and other objects in view there is provided, in accordance with the invention, a crash protection apparatus for a pulling device having a hollow-piston cylinder with a hollow piston providing a stationary support against the tube sheet during pulling, a tie rod supporting a pulling claw for pulling a tube out of tube sheet of a heat exchanger chamber in which the pulling device is disposed and a shell moving the tie rod, the crash protection apparatus comprising another cylinder without a piston rod having an axis substantially parallel to the axis of the hollow-piston cylinder and being fixed relative to the tube sheet in the chamber, a piston of the other cylinder, a bracket extending from the piston substantially at a right angle to the axis of the other cylinder for supporting the pulling device with a supporting force provided by the other cylinder, and means for controlling the supporting force for compensating only the weight of the pulling device in each position of the pulling device. The pulling device is reliably secured by the counterforce acting continuously in the direction toward the tube sheet. The counterforce which is limited in every operating phase to the weight of the pulling device, ensures that the tube pulling forces of the device do not act on the crash protection apparatus.

In accordance with another feature of the invention, there is provided a collar having two support elements and a prismatic guide associated with the hollow-piston cylinder. The crash protection apparatus carries the pulling device through the support elements, and the prismatic guide serves as the connecting member to a manipulator, with the aid of which the pulling device is suspended from the bracket.

In accordance with an additional feature of the invention, the collar is clamped to the hollow-piston cylinder. This connection is easy to open and requires no additional holding elements at the hollow piston cylinder.

In accordance with a further feature of the invention, the collar includes two halves, and a screw connection moving the halves relative to each other, each of the support elements being supported by both of the halves and being adjustable after clamping the collar to the hollow-piston cylinder.

In accordance with a concomitant feature of the invention, the other cylinder has an upper and a lower cylinder space formed therein, and the supporting force control means includes a control line leading to the lower cylinder space, a control line leading to the upper cylinder space, a secondary line connected to the control line leading to the lower cylinder space, a throttling valve connected in the secondary line for throttling control medium flowing in a given flow direction in the secondary line to a pressure compensating the weight of the pulling device, and a pressure switching valve connected to the secondary line downstream of the throttling valve in the given flow direction for reducing pressure in the lower cylinder space generated by pulling a tube, to a throttled pressure value.

Without adding the secondary line, the pulling device with the other cylinder without a piston rod extending parallel to it can be brought into the pulling position or can be removed from the pulling position. By adding the secondary line, it is assured that an air cushion is always maintained in the lower cylinder space during the pulling operation, which compensates the weight of the pulling device itself and it is assured that compression exceeding this pressure cannot build up in the lower cylinder space.

Other features which are considered as characteristic for the invention are set forth in the appended claims.

Although the invention is illustrated and described herein as embodied in a crash protection apparatus for a device for pulling a tube out of a tube sheet of a heat exchanger, it is nevertheless not intended to be limited to the details shown, since various modifications and structural shanges may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 5 is a schematic and diagrammatic circuit diagram for controlling the crash protection apparatus.

Figure 1:
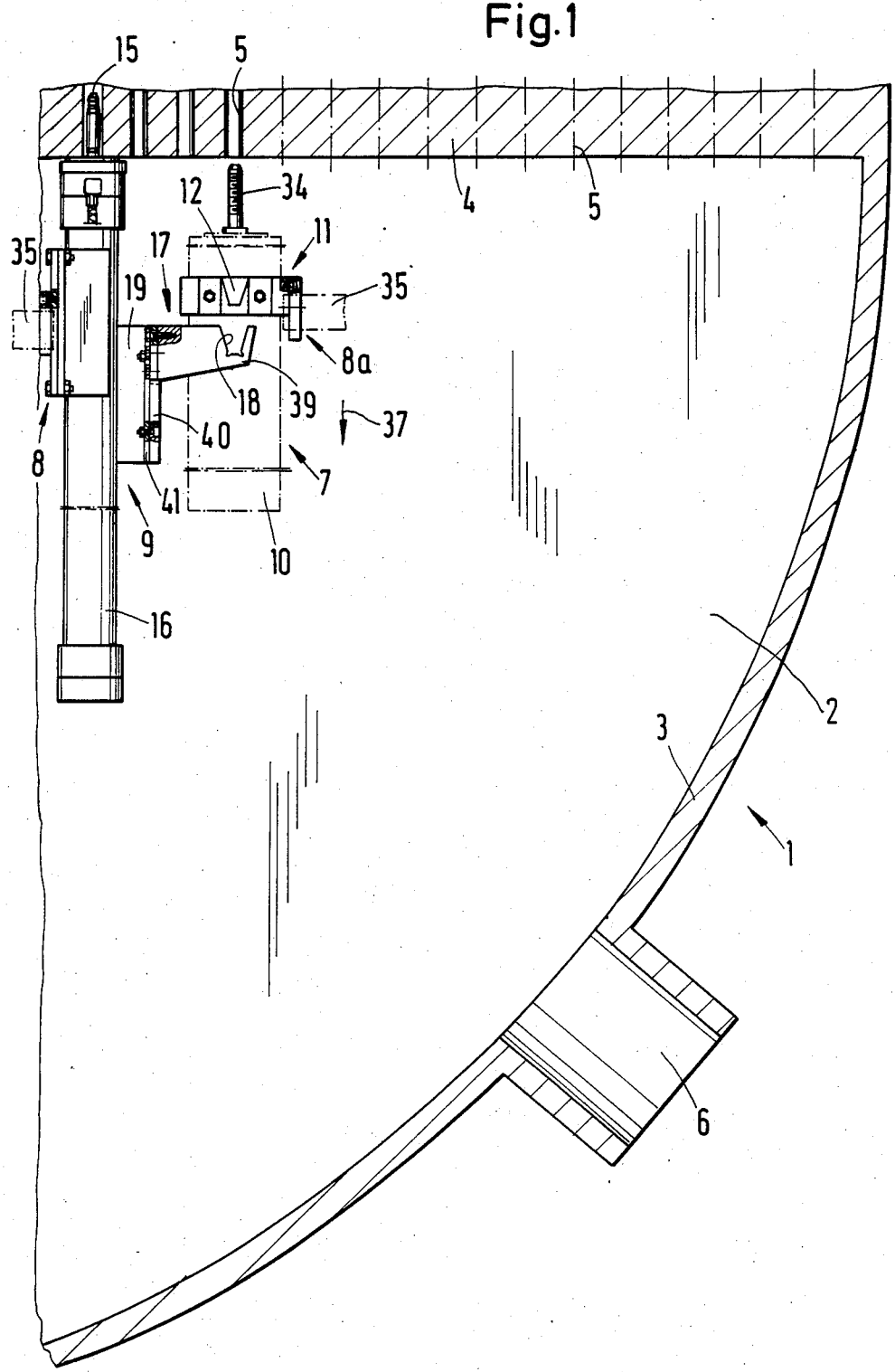
FIG. 1 is a fragmentary, diagrammatic, cross-sectional view of a chamber of a heat exchanger with a device disposed therein for pulling out tubes and a crash protection apparatus.
Figure 2:
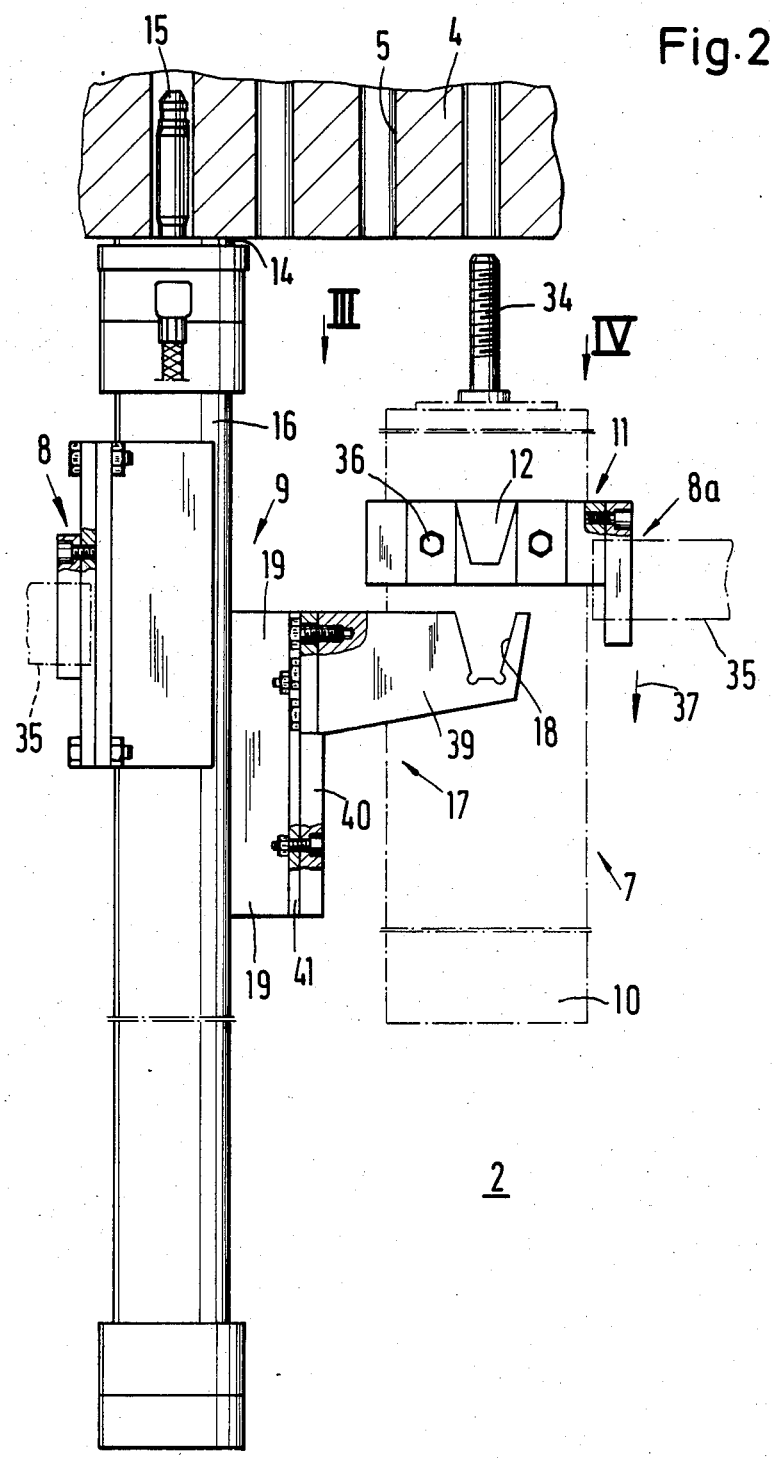
FIG. 2 is a portion of FIG. 1 on an enlarged scale.
Figure 3:
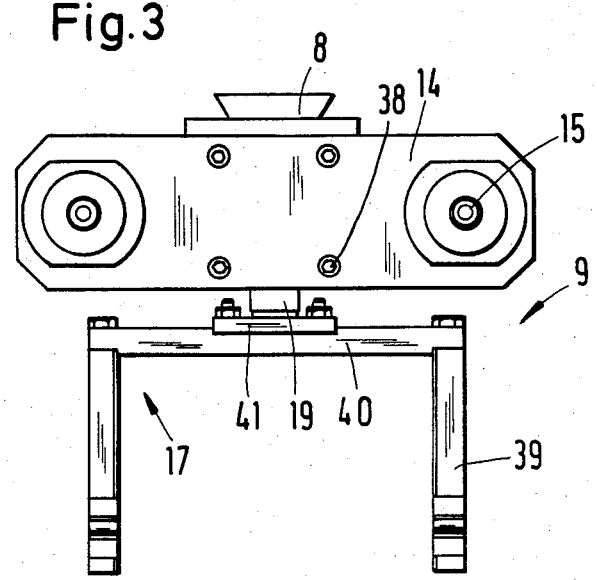
FIG. 3 is a top-plan view of the crash protection apparatus as seen in the direction of the arrow III in FIG. 2.

Referring now to the figures of the drawings in detail and first, particularly, to FIG. 1 thereof, there is seen a portion of a heat exchanger 1 provided for generating steam, particularly in nuclear power generating stations. A chamber 2 which is provided for feeding and discharging the reactor coolant, is bordered by a hemispherical bottom 3 and a tube sheet 4. A multiplicity of tubes 5 end in the tube sheet 4. In order to assure a clear presentation, only a few of the approximately 4000 tubes ending in the tube sheet are shown. In order to avoid radiation exposure, the repair or inspection devices must be placed in the chamber 2 through a man hole 6, if possible under remote control and they must be manipulated there. This also applies also to a device 7 for pulling the tubes 5 out of the tube sheet 4. A manipulator 35 which is already available in the chamber 2 grips a crash protection apparatus 9 shown on a larger scale in FIG. 2, with a prismatic guide 8. On one hand, meshing parts of the guide 8 are bolted to the crash protection 9 apparatus and on the other hand, they are connected to the manipulator 35. The manipulator 35 brings the crash protection apparatus 9 into position relative to the tube sheet in such a manner that two spreading fingers 15 fastened to a mounting plate 14 engage the tubes 5 and are locked there. The mounting plate 14 is connected to a cylinder 16 by screws 38, as seen in FIG. 3. The cylinder 16 has no piston rod but it has a piston 19 from which a bracket 17 extends. The bracket 17 is formed of two struts 39 and a connecting strap 40. The connecting strap of the bracket 17 is bolted to a stop plate 41 of the piston 19.

Figure 4:
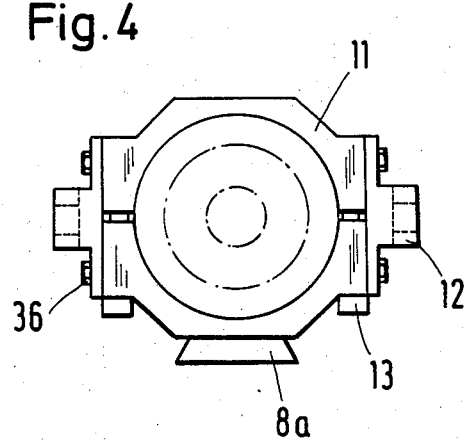
FIG. 4 is a top-plan view of a sleeve for holding a device, as seen in the direction of the arrow IV in FIG. 2.

A hydraulic cylinder 10 of the device 7 which is constructed as a hollow-piston cylinder, includes a hollow piston braced against the tube sheet for removing a tube, a shell, a tie rod connected to the shell, and a pulling claw 34 connected to the tie rod and movable with the shell for removing a tube. The cylinder 10 is associated with a collar 11 which is shown in particular in FIG. 4. The collar 11 has two support elements 12 and a prismatic guide 8a. Two screws 13 permit the two halves of the collar 11 to be moved relative to each other and can provide a reliable clamping connection to the device 7. After the clamping connection is established, the support elements 12 are connected to the collar 11 by means of screws 36, in such a manner that each support element is carried by the two halves of the sleeve. The passage openings for the screws 36 are formed as elongated holes, so that an adjustment of the support elements 12 is possible.

By engaging the prismatic guide 8a, the manipulator 35 transfers the device 7 to the crash protection apparatus 9. As soon as the device 7 is entrained by inserting the wedge-shaped support elements 12 into recesses 18 formed in the bracket 17 with a similar shape, the task of the manipulator is complete. For greater clarity, the device 7 is shown in FIG. 2 during the lowering motion in the direction of an arrow 37, i.e. before the wedge-shaped support elements 12 are deposited in the wedge-shaped recesses 18 of the bracket 17. The cylinder 16 without a piston rod which is parallel to the device 7, is moved in the direction toward the tube sheet 4 over such a distance that pulling claw 34 of the device 7 has arrived in its operating position. During the motion of the device 7 into and out of its pulling position as well as during the pulling process proper, the device 7 which weighs about 20 kg, is always secured against crashing.

A circuit for controlling the cylinder 16 without a piston rod, which is part of the crash protection apparatus 9, will be described by making reference to FIG. 5. The piston 19 of the cylinder 16 separates a lower cylinder space 21 which is connected to a control line or leg 20, from an upper cylinder space 23 which is connected to a control line or leg 22. The control lines or legs 20, 22 are connected to an air connection 24 which feeds air at a pressure of about 6 bar. The control lines, in conjunction with multi-way valves 25, 26 built into the control lines and throttling valves 27, 28, provide vertical motion of the piston 19 and therefor of the device 7 supported by the piston 19 through the bracket 17. This motion is necessary for raising the device 7 into its pulling position and for removing it.

During the pulling operation, the cylinder 16 without a piston rod provides crash protection for the device 7, which weighs about 20 kg. To this end, a secondary line or leg 29 is connected to the lower cylinder space 21. By switching the multi-way valve 25 into a corresponding position and by switching multi-way valves 30, 31 associated with the secondary line 29 into the open position, air with a pressure of 6 bar flow from the source or air connection 24 into the secondary line 29. A throttling valve 32 built into the secondary line reduces the pressure to the extent that it represents an equilibrium force for the weight of the device 7 proper. During the pulling motion of the device 7, the piston 19 is forced to move down. In order to prevent pressure from building up in the lower cylinder space 21, which would ultimately mean transmission of the pulling force onto the spreading fingers of the cylinder 16, a pressure switching valve 33 is connected to the secondary line 29 above the throttling valve 32. If the pressure in the lower cylinder space 21 increases beyond the equilibrium force adjusted by means of the throttling valve 32, the pressure switching valve 33 switches and removes the overpressure. Thus during the entire pulling process, only a pressure which compensates the weight of the device 7, always prevails in the lower cylinder space 21. This pressure is also maintained in the event of an undesired loosening of the pulling claw 34 from a tube 5. The device 7 is thus reliably secured against crashing in each operating phase, without a greater force than is represented by the weight of the device 7 acting on the crash protection apparatus 9 itself.

I claim:

1. Crash protection apparatus for a pulling device having a first hollow-piston cylinder and a pulling claw for pulling a tube out of a tube sheet of a heat exchanger chamber in which the pulling device is disposed, the crash protection apparatus comprising a second cylinder without a piston rod having an axis substantially parallel to the axis of the first hollow-piston cylinder and being fixed relative to the tube sheet in the chamber, a piston of said second cylinder, a bracket extending from said piston substantially at a right angle to the axis of said second cylinder for supporting the pulling device with a supporting force provided by said other cylinder, and means for controlling the supporting force for compensating only the weight of the pulling device in each position of the pulling device.

2. Apparatus according to claim 1, including a collar having two support elements and a prismatic guide associated with the first hollow-piston cylinder.

3. Apparatus according to claim 2, wherein said collar is clamped to the first hollow-piston cylinder.

4. Apparatus according to claim 2, wherein said collar includes two halves, and a screw connection moving said halves relative to each other, each of said support elements being supported by both of said halves and being adjustable after clamping the first collar to said hollow-piston cylinder.

5. Apparatus according to claim 1, wherein said second cylinder has an upper and a lower cylinder space formed therein, and said supporting force control means includes a control line leading to said lower cylinder space, a control line leading to said upper cylinder space, a secondary line connected to said control line leading to said lower cylinder space, a throttling valve connected in said secondary line for throttling control medium flowing in a given flow direction in said secondary line to a pressure compensating the weight of said pulling device, and a pressure switching valve connected to said secondary line downstream of said throttling valve in said given flow direction for reducing pressure in said lower cylinder space generated by pulling a tube, to a throttled pressure value.

* * * * *